United States Patent
Zhang et al.

(10) Patent No.: US 10,912,037 B2
(45) Date of Patent: Feb. 2, 2021

(54) APPARATUS AND METHOD FOR CONTROLLING UPLINK POWER CONTROL IN COMMUNICATION SYSTEM

(71) Applicant: Samsung Electronics Co., Ltd, Gyeonggi-do (KR)

(72) Inventors: Shichang Zhang, Beijing (CN); Chengjun Sun, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/400,816

(22) Filed: Jan. 6, 2017

(65) Prior Publication Data

US 2017/0215149 A1    Jul. 27, 2017

Related U.S. Application Data

(63) Continuation of application No. 14/395,804, filed as application No. PCT/KR2013/003183 on Apr. 16, 2013, now abandoned.

(30) Foreign Application Priority Data

Apr. 20, 2012 (CN) .......................... 2012 1 0119209
Apr. 11, 2013 (KR) ........................ 10-2013-0040011

(51) Int. Cl.
*H04W 52/14*     (2009.01)
*H04W 52/16*     (2009.01)
(Continued)

(52) U.S. Cl.
CPC .............. *H04W 52/146* (2013.01); *H04L 5/14* (2013.01); *H04L 5/1469* (2013.01); *H04W 52/16* (2013.01); *H04W 52/223* (2013.01); *H04W 52/247* (2013.01); *H04W 52/325* (2013.01); *H04W 72/0413* (2013.01);
(Continued)

(58) Field of Classification Search
None
See application file for complete search history.

(56) References Cited

U.S. PATENT DOCUMENTS 8,285,319 B2    10/2012    Shin et al.
2006/0046789 A1    3/2006    Huh et al.
(Continued)

FOREIGN PATENT DOCUMENTS

CN    101835253 A    9/2010
CN    102026209 A    4/2011
(Continued)

OTHER PUBLICATIONS

Chinese Office Action for Chinese Application No. 201210119209.0, dated Jul. 4, 2017 (5 pages).
(Continued)

*Primary Examiner* — Mohammad S Adhami

(57) ABSTRACT

The present invention provides an apparatus and method for uplink signal power control in a dynamic Time Division Duplexing (TDD) cell. According to the method, after accessing a dynamic TDD cell, a User Equipment (UE) receives from an evolved NodeB (eNB) an uplink power control parameter which has been adjusted for a conflict uplink sub-frame.

16 Claims, 6 Drawing Sheets

(51) Int. Cl.
*H04W 52/24* (2009.01)
*H04W 72/04* (2009.01)
*H04L 5/14* (2006.01)
*H04W 52/32* (2009.01)
*H04W 76/27* (2018.01)
*H04W 52/22* (2009.01)
*H04W 52/50* (2009.01)

(52) U.S. Cl.
CPC ....... *H04W 72/0446* (2013.01); *H04W 76/27* (2018.02); *H04W 52/50* (2013.01)

(56) References Cited

U.S. PATENT DOCUMENTS

| | | | |
|---|---|---|---|
| 2008/0220806 A1 | 9/2008 | Shin et al. | |
| 2010/0041428 A1* | 2/2010 | Chen | H04W 52/16 455/522 |
| 2010/0220597 A1 | 9/2010 | Ji et al. | |
| 2011/0039589 A1* | 2/2011 | Skov | H04W 52/146 455/501 |
| 2011/0117953 A1 | 5/2011 | Kim et al. | |
| 2011/0207499 A1 | 8/2011 | Liu | |
| 2011/0228731 A1 | 9/2011 | Luo et al. | |
| 2011/0235582 A1 | 9/2011 | Chen et al. | |
| 2011/0267994 A1 | 11/2011 | Pan et al. | |
| 2012/0257519 A1 | 10/2012 | Frank et al. | |
| 2012/0307745 A1 | 12/2012 | Panchan et al. | |
| 2012/0327804 A1 | 12/2012 | Park et al. | |
| 2013/0242823 A1* | 9/2013 | Lin | H04W 99/00 370/280 |
| 2013/0258884 A1 | 10/2013 | Xu et al. | |
| 2014/0161003 A1* | 6/2014 | Han | H04W 52/146 370/280 |
| 2014/0307652 A1* | 10/2014 | Zhang | H04W 52/325 370/329 |
| 2015/0043392 A1* | 2/2015 | Susitaival | H04L 5/1469 370/280 |
| 2015/0189666 A1 | 7/2015 | Wang et al. | |
| 2015/0256320 A1 | 9/2015 | Feng et al. | |
| 2017/0048039 A1* | 2/2017 | Zhao | H04L 5/0048 |

FOREIGN PATENT DOCUMENTS

| | | |
|---|---|---|
| CN | 102104943 A | 6/2011 |
| CN | 102281638 | 12/2011 |
| KR | 10-2006-0016042 | 2/2006 |
| WO | 2011127435 A1 | 10/2011 |

OTHER PUBLICATIONS

Intellectual Property India, Examination report under sections 12 & 13 of the Patents Act, 1970 and the Patents Rules 2003, Application No. IN 8305/CHENP/2014, Nov. 26, 2019, 6 pages.

International Search Report dated Jun. 11, 2013 in connection with International Patent Application No. PCT/KR2013/003183, 3 pages.

Extended European Search Report dated Oct. 2, 2015 in connection with European Patent Application No. 13777975.7; 7 pages.

Renesas Mobile Europe, "Discussions on Common Solution CC Specific TDD Configuration", 3GPP TSG-RAN WG1 Meeting #68, R1-120370, Dresden, Germany, Feb. 6-10, 2012, 10 pages.

* cited by examiner

[Fig. 2]
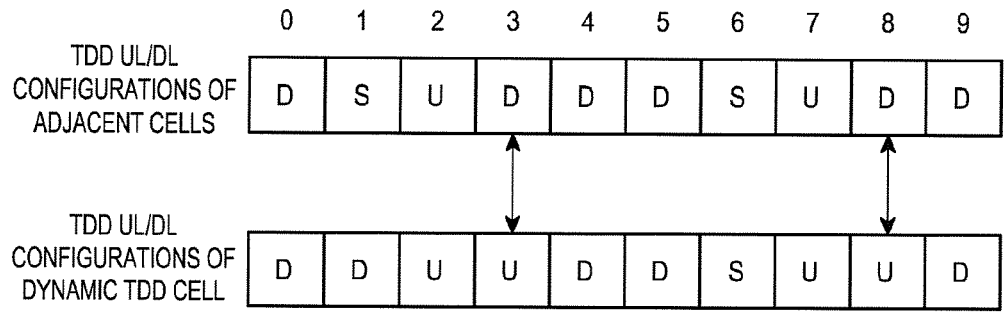
[Fig. 3]
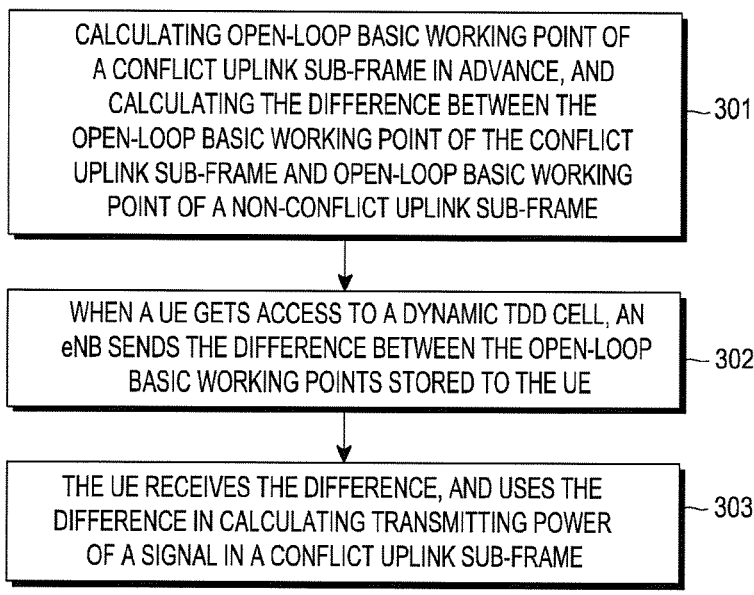
[Fig. 4]
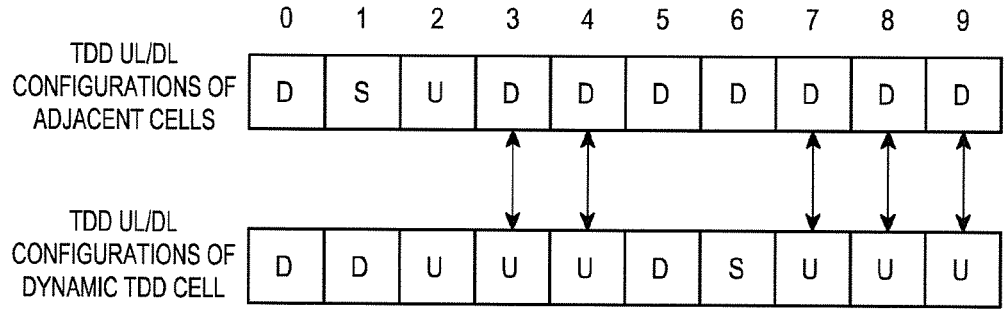

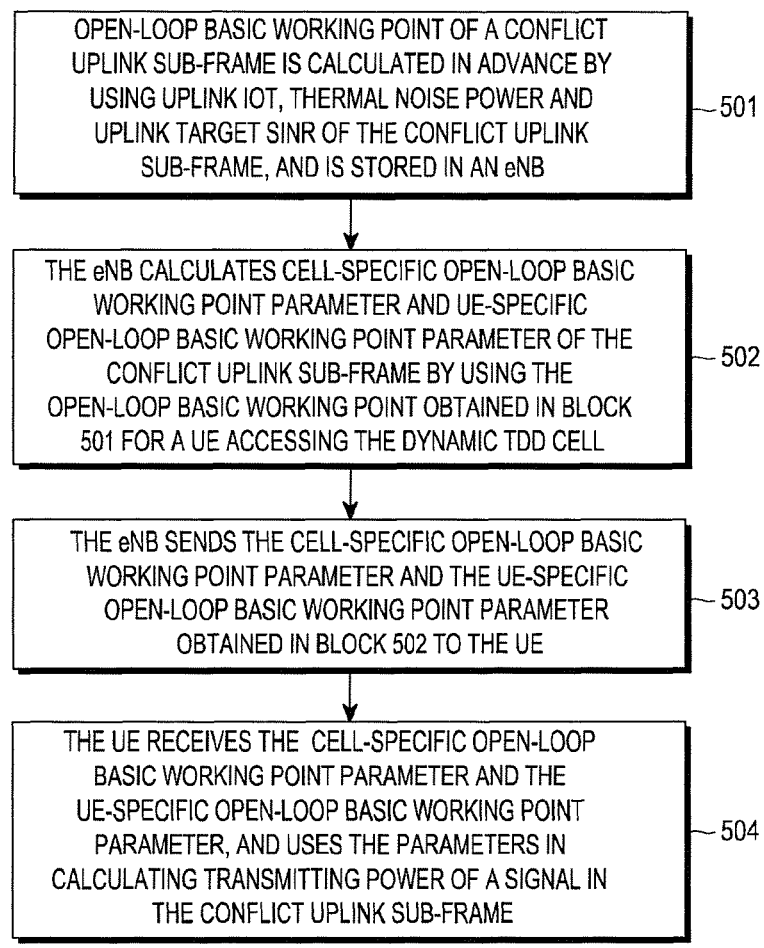
[Fig. 5]

[Fig. 6]
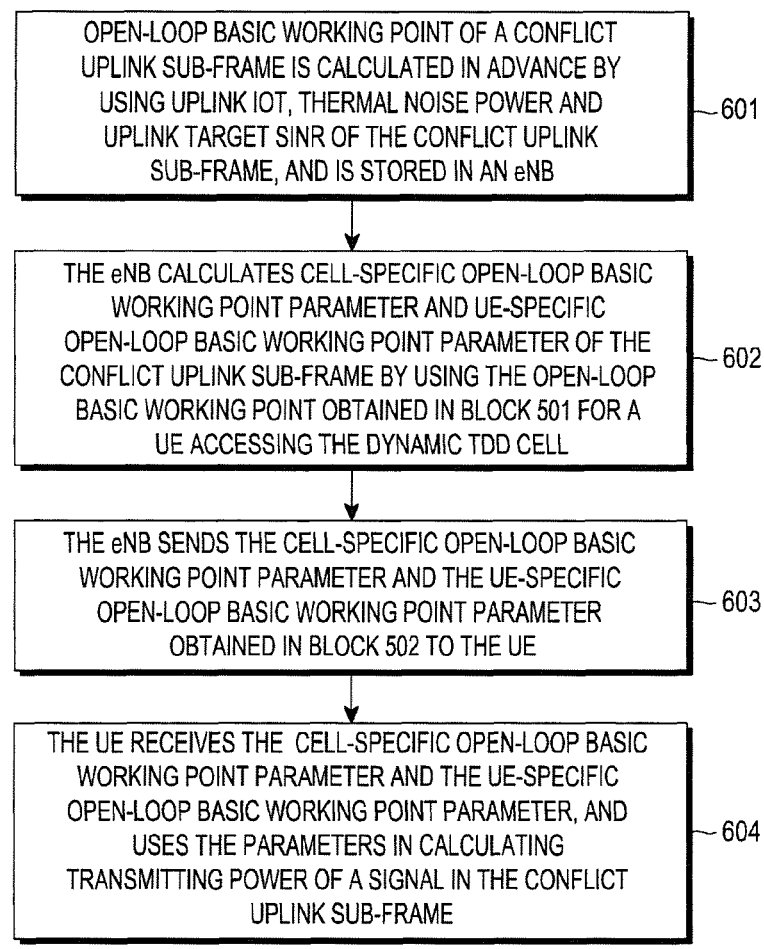

[Fig. 7]
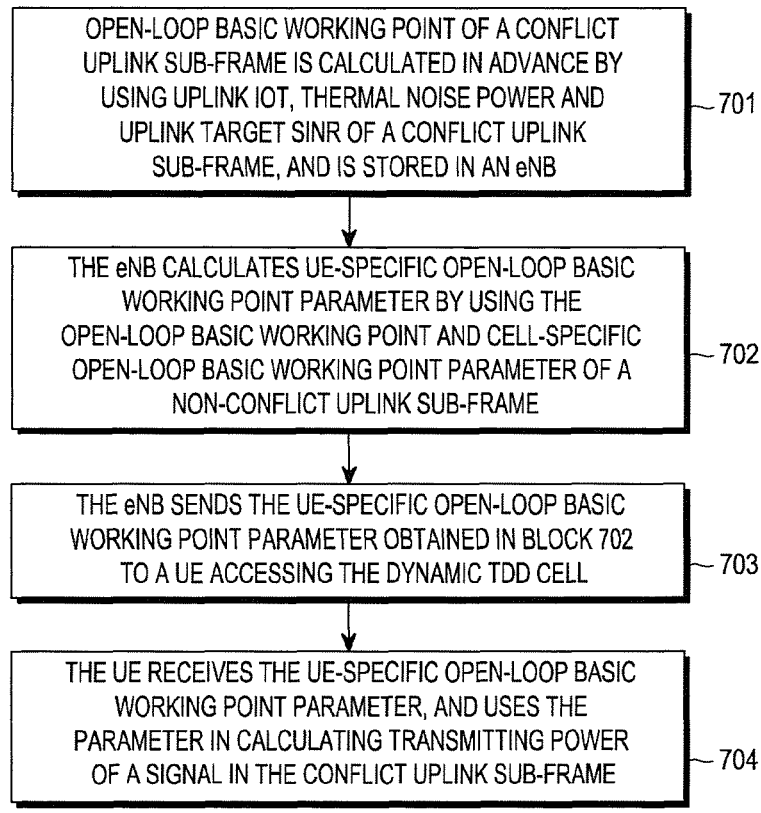
[Fig. 8]
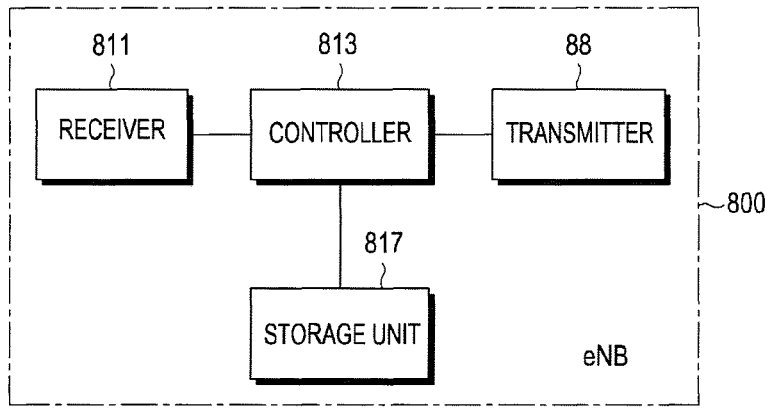

[Fig. 9]
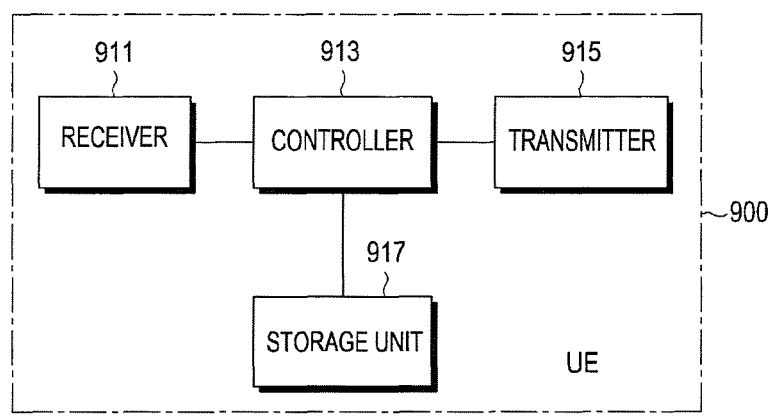

APPARATUS AND METHOD FOR CONTROLLING UPLINK POWER CONTROL IN COMMUNICATION SYSTEM

CROSS-REFERENCE TO RELATED APPLICATIONS AND CLAIM OF PRIORITY

The present application is a continuation of U.S. patent application Ser. No. 14/395,804 filed Oct. 20, 2014, which is related to and claims priority under 35 U.S.C. § 365 to International Patent Application No. PCT/KR2013/003183 filed Apr. 16, 2013, entitled "APPARATUS AND METHOD FOR CONTROLLING UPLINK POWER CONTROL IN COMMUNICATION SYSTEM". International Patent Application No. PCT/KR2013/003183 claims priority under 35 U.S.C. § 365 and/or 35 U.S.C. § 119(a) to Chinese Patent Application No. 201210119209.0 filed on Apr. 20, 2012 and Korean Patent Application No. 10-2013-0040011 filed Apr. 11, 2013, all of which are incorporated herein by reference into the present disclosure as if fully set forth herein.

TECHNICAL FIELD

The present invention relates to an apparatus and method for controlling uplink power in a communications system, and particularly to an apparatus and method for controlling uplink power in a dynamic Time Division Duplexing (TDD) cell in a communications system.

BACKGROUND ART

3rd Generation Partnership Project (3GPP) Long-Term Evolution (LTE) systems support both a Frequency Division Duplexing (FDD) scheme and a Time Division Duplexing (TDD) scheme. In an LTE TDD communication system, each radio frame has a length of 10 ms and includes two half-frames. Each half-frame has a length of 5 ms.

FIG. 1 schematically illustrates a frame structure in a conventional LTE TDD communication system.

Referring to FIG. 1, Each half-frame includes 8 time slots each of which has a length of 0.5 ms and 3 special fields, i.e. a Downlink Pilot Time Slot (DwPTS) field, a Guarding Period (GP) field, and a Uplink Pilot Time Slot (UpPTS) field. The 3 special fields have a total length of 1 ms. In addition, each sub-frame in the frame structure in the LTE TDD communication system shown in FIG. 1 includes two successive time slots, i.e. the k'th sub-frame contains time slot 2k and time slot 2k+1.

The LTE TDD communication system supports 7 types of uplink-downlink configurations as shown in Table 1, where D represents downlink sub-frame, U represents uplink sub-frame, S represents special sub-frames in the 3 special fields.

In current LTE protocol specifications, TDD uplink-downlink configurations of a cell are semi-static, i.e. an enhanced NodeB (eNB) will not frequently change TDD uplink-downlink configurations of the cell, and the TDD uplink-downlink configurations in a cell will not change during at least one data transmission.

Table 1

TABLE 1

| Configuration serial number | Switch-point periodicity | Sub-frame ID | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In conventional LTE/LTE-A communication systems, transmitting power of an uplink sub-frame is controlled by an eNB. An eNB transmits static and semi-static uplink power control parameters to a UE via a broadcast message and a Radio Resource Control (RRC) layer message. The UE determines the transmitting power of a Physical Uplink Shared Channel (PUSCH) and/or a Physical Uplink Control Channel (PUCCH) in each uplink sub-frame based on the uplink power control parameters and a power control command received previously from a Physical Downlink Control Channel (PDCCH).

For example, if the PUSCH and the PUCCH are not transmitted in the same uplink sub-frame, the power of the PUSCH in sub-frame i of the current cell c can be determined by using a Math Figure 1).

MathFigure 1

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{[Math. 1]}$$

Detailed information for the physical quantities in the formula (1) can be found in 3GPP 36.213. Here, $$P_{O\_PUSCH,c}(j) = P_{O\_NOMINAL\_PUSCH,c}(j) + P_{O\_UE\_PUSCH,c}(j)$$

is referred to as power control open-loop basic working point of the PUSCH.

The power of the PUCCH in sub-frame i of the current cell c can be determined by a Math Figure 2).

MathFigure 2

$$P_{PUCCH}(i) = \min \begin{Bmatrix} P_{CMAX,c}(i), \\ P_{O\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBm] \quad \text{[Math. 2]}$$

Detailed information for the physical quantities in the formula (2) can be found in 3GPP 36.213. Here, $$P_{O\_PUCCH} = P_{O\_NOMINAL\_PUCCH} + P_{O\_UE\_PUCCH}$$

is referred to as power control open-loop basic working point of the PUCCH.

With the demand for higher data transmission rate, an LTE-Advanced (LTE-A) communication system is proposed. In the LTE-A communication system, a dynamic TDD scheme is adopted to keep the ratio of current uplink sub-frames to current downlink sub-frames more consistent with the proportion of current uplink traffic load to current downlink traffic load, which is good for increasing uplink-downlink peak transmission rate of users and increasing system throughput.

FIG. 2 schematically illustrates a conflict uplink sub-frame structure and a nonconflict uplink sub-frame structure in a conventional LTE-A communication system.

For a dynamic TDD communication system, TDD UL/DL (uplink-downlink) configurations are changing dynamically with the UL/DL traffic load in the current cell. Therefore, at a moment, TDD UL/DL configurations of the current cell may be different from those of adjacent cells, and an adjacent cell may transmit a downlink sub-frame at a position where the current dynamic TDD cell transmits an uplink sub-frame, as in the case for the sub-frames 3 and 8 of the dynamic TDD cell as shown in FIG. 2, and such sub-frames are referred to as conflict sub-frames. Transmission in a conflict uplink sub-frame make an eNB receive fewer interference from other UEs but receive much larger interference from downlink signals of adjacent eNBs. As well-known, in LTE network systems, transmitting power of downlink signals is far bigger than that of uplink signals. Therefore, compared with non-conflict uplink sub-frames, which refer to sub-frames which are uplink in both the current dynamic TDD cell and in adjacent cells such as sub-frames 2 and 7 of dynamic TDD cell in FIG. 2, conflict uplink sub-frames may suffer larger interferences.

Through the above analysis it can be seen that uplink IoT (Interference over Thermal) in conflict uplink sub-frames may vary with changes in interference environment. In order to make uplink signals transmitted in conflict uplink sub-frames have the same SINR (Signal to Interference and Noise Ratio) at the eNB as uplink signals transmitted in non-conflict uplink sub-frames, the eNB needs to re-configure or adjust basic open-loop working point of uplink signal power for conflict uplink sub-frames. But there is still no mature solutions to this problem.

DISCLOSURE OF INVENTION

Technical Problem

Embodiments of the present invention provide an apparatus and method for controlling uplink power in a communications system.

Embodiments of the present invention provide an apparatus and method for controlling uplink power in a dynamic TDD cell in a communications system.

Embodiments of the present invention provide an apparatus and method for controlling transmitting power of PUSCH/PUCCH in a conflict uplink sub-frame in a communications system.

Embodiments of the present invention provides an apparatus and method for uplink power control in a dynamic TDD cell which can implement rational control over transmitting power of PUSCH/PUCCH in a conflict uplink sub-frame.

To attain the above objective, the present invention adopts the following technical solutions.

Solution to Problem

An aspect of the present invention, a method for uplink power control in a dynamic Time Division Duplexing (TDD) cell may include:

receiving, by a User Equipment (UE) accessing a dynamic TDD cell, a difference $\Delta_{PUSCH}/\Delta_{PUCCH}$ between a power control open-loop basic working point of Physical Uplink Shared CHannel (PUSCH)/Physical Uplink Control CHannel (PUCCH) in a conflict uplink sub-frame and a power control open-loop basic working point of PUSCH/PUCCH in a non-conflict uplink sub-frame from an enhanced NodeB (eNB); wherein the power control open-loop basic working point of PUSCH/PUCCH in a conflict uplink sub-frame is obtained by performing calculations using uplink Interference over Thermal (IoT), thermal noise power and uplink target Signal to Interference and Noise Ratio (SINR) of the conflict uplink sub-frame; and adding, by the UE, the difference $\Delta_{PUSCH}/\Delta_{PUCCH}$ to a power control open-loop basic working point of PUSCH/PUCCH in calculating an uplink transmitting power of PUSCH/PUCCH in the conflict uplink sub-frame.

Preferably, the difference $\Delta_{PUSCH}/\Delta_{PUCCH}$ is received by the UE via a Radio Resource Control (RRC) layer message, a system broadcasting message or a physical layer message.

Preferably, the RRC layer message, the system broadcasting message or the physical layer message is a customized message or a conventional message.

Another aspect of the present invention, a method for uplink power control in a dynamic Time Division Duplexing (TDD) cell may include:

receiving, from an enhanced NodeB (eNB) by a User Equipment (UE) accessing a dynamic TDD cell, a cell-specific open-loop basic working point parameter $P_{O\_Nominal\_PUSCH\_Dyn}/P_{O\_Nominal\_PUCCH\_Dyn}$ of Physical Uplink Shared CHannel (PUSCH)/Physical Uplink Control CHannel (PUCCH) in a conflict uplink sub-frame and a UE-specific open-loop basic working point parameter $P_{O\_UE\_PUSCH\_Dyn}/P_{O\_UE\_PUCCH\_Dyn}$ of PUSCH/PUCCH in the conflict uplink sub-frame which are obtained by using a power control open-loop basic working point of PUSCH/PUCCH in the conflict uplink sub-frame; wherein the power control open-loop basic working point of PUSCH/PUCCH in the conflict uplink sub-frame is obtained by performing calculations using uplink Interference over Thermal (IoT), thermal noise power and uplink target Signal to Interference and Noise Ratio (SINR) of the conflict uplink sub-frame;

calculating, by the HE, uplink transmitting power of PUSCH/PUCCH in the conflict uplink sub-frame by using the received $P_{O\_Nominal\_PUSCH\_Dyn}/P_{O\_Nominal\_PUCCH\_Dyn}$ and the $P_{O\_UE\_PUSCH\_Dyn}/P_{O\_UE\_PUCCH\_Dyn}$.

Preferably, the difference $P_{O\_Nominal\_PUSCH\_Dyn}/P_{O\_Nominal\_PUCCH\_Dyn}$ is received by the UE via a Radio Resource Control (RRC) layer message, a system broadcasting message or a physical layer message;

and/or the $P_{O\_UE\_PUSCH\_Dyn}/P_{O\_UE\_PUCCH\_Dyn}$ is received by the UE via an RRC layer message or a physical layer message.

Preferably, the RRC layer message, the system broadcasting message or the physical layer message is a customized message or a conventional message.

Further another aspect of the present invention, a method for uplink power control in a dynamic Time Division Duplexing (TDD) cell may include:

receiving, from an enhanced NodeB (eNB) by a User Equipment (UE) accessing a dynamic IDD cell, a cell-specific open-loop basic working point parameter $P_{O\_Nominal\_PUSCH\_Dyn}/P_{O\_Nominal\_PUCCH\_Dyn}$ of Uplink Shared CHannel (PUSCH)/Physical Uplink Control CHannel (PUCCH) in a conflict uplink sub-frame which is obtained by using a power control open-loop basic working point of PUSCH/PUCCH in the conflict uplink sub-frame; wherein the power control open-loop basic working point of PUSCH/PUCCH in the conflict uplink sub-frame is obtained by performing calculations using uplink Interference over Thermal (IoT), thermal noise power and uplink target Signal to Interference and Noise Ratio (SINR) of the conflict uplink sub-frame; and calculating, by the UE, uplink transmitting power of PUSCH/PUCCH in the conflict uplink sub-frame by using the received $P_{O\_Nominal\_PUSCH\_Dyn}/P_{O\_Nominal\_PUCCH\_Dyn}$.

Preferably, the $P_{O\_Nominal\_PUSCH\_Dyn}/P_{O\_Nominal\_PUCCH\_Dyn}$ is received by the UE via a Radio Resource Control (RRC) layer message, a system broadcasting message or a physical layer message.

Preferably, the RRC layer message, the system broadcasting message or the physical layer message is a customized message or a conventional message.

Still another aspect of the present invention, a method for uplink power control in a dynamic Time Division Duplexing (TDD) cell may include:

receiving, from an enhanced NodeB (eNB) by a User Equipment (UE) accessing a dynamic TDD cell, a UE-specific open-loop basic working point parameter $P_{O\_UE\_PUSCH\_Dyn}/P_{O\_UE\_PUCCH\_Dyn}$ of Physical Uplink Shared CHannel (PUSCH)/Physical Uplink Control CHannel (PUCCH) in a conflict uplink sub-frame which is obtained by performing calculations using a power control open-loop basic working point of PUSCH/PUCCH in the conflict uplink sub-frame and a cell-specific open-loop basic working point parameter $P_{O\_NOMINAL\_PUSCH,c}(j)/P_{O\_NOMINAL\_PUCCH,c}(j)$ of PUSCH/PUCCH in a non-conflict uplink sub-frame; wherein the power control open-loop basic working point of PUSCH/PUCCH in the conflict uplink sub-frame is obtained by performing calculations using uplink Interference over Thermal (IoT), thermal noise power and uplink target Signal to Interference and Noise Ratio (SINR) of the conflict uplink sub-frame;

calculating, by the UE, uplink transmitting power of PUSCH/PUCCH in the conflict uplink sub-frame by using the received $P_{O\_UE\_PUSCH\_Dyn}/P_{O\_UE\_PUCCH\_Dyn}$.

Preferably, the $P_{O\_UE\_PUSCH\_Dyn}/P_{O\_UE\_PUCCH\_Dyn}$ obtained by performing calculations using the power control open-loop basic working point of PUSCH/PUCCH of the conflict uplink sub-frame and the $P_{O\_NOMINAL\_PUSCH,c}(j)/P_{O\_NOMINAL\_PUCCH,c}(j)$ is obtained by:

$P_{O\_UE\_PUSCH\_Dyn}/P_{O\_UE\_PUCCH\_Dyn}$=the power control open-loop basic working point of PUSCH/PUCCH in the conflict sub-frame—$P_{O\_NOMINAL\_PUSCH,c}(j)/P_{O\_NOMINAL\_PUCCH,c}(j)$.

Preferably, the $P_{O\_UE\_PUSCH\_Dyn}/P_{O\_UE\_PUCCH\_Dyn}$ is received by the UE via a Radio Resource Control (RRC) layer message or a physical layer message.

Preferably, the RRC layer message, the system broadcasting message or the physical layer message is a customized message or a conventional message.

Still another aspect of the present invention, a User Equipment (UE) in a dynamic Time Division Duplexing (TDD) cell may include:

a receiver for receiving, if a UE accesses a dynamic TDD cell, a difference $\Delta_{PUSCH}/\Delta_{PUCCH}$ between a power control open-loop basic working point of Physical Uplink Shared Channel (PUSCH)/Physical Uplink Control Channel (PUCCH) in a conflict uplink sub-frame and a power control open-loop basic working point of PUSCH/PUCCH in a non-conflict uplink sub-frame from an evolved NodeB (eNB); wherein the power control open-loop basic working point of PUSCH/PUCCH in a conflict uplink sub-frame is obtained by performing calculations using uplink Interference over Thermal (IoT), thermal noise power and uplink target Signal to Interference and Noise Ratio (SINR) of the conflict uplink sub-frame; and a controller for adding the difference $\Delta_{PUSCH}/\Delta_{PUCCH}$ to a power control open-loop basic working point of PUSCH/PUCCH in calculating an uplink transmitting power of PUSCH/PUCCH in the conflict uplink sub-frame.

Preferably, the difference $\Delta_{PUSCH}/\Delta_{PUCCH}$ is received by the UE via a Radio Resource Control (RRC) layer message, a system broadcasting message or a physical layer message.

Preferably, the RRC layer message, the system broadcasting message or the physical layer message is a customized message or a conventional message.

Still another aspect of the present invention, a User Equipment (UE) in a dynamic Time Division Duplexing (TDD) cell may include:

a receiver for receiving, from an evolved NodeB (eNB), if a UE accesses a dynamic TDD cell, a cell-specific open-loop basic working point parameter $P_{O\_Nominal\_PUSCH\_Dyn}/P_{O\_Nominal\_PUCCH\_Dyn}$ of Physical Uplink Shared Channel (PUSCH)/Physical Uplink Control Channel (PUCCH) in a conflict uplink sub-frame and a UE-specific open-loop basic working point parameter $P_{O\_UE\_PUSCH\_Dyn}/P_{O\_UE\_PUCCH\_Dyn}$ of PUSCH/PUCCH in the conflict uplink sub-frame which are obtained by using a power control open-loop basic working point of PUSCH/PUCCH in the conflict uplink sub-frame; wherein the power control open-loop basic working point of PUSCH/PUCCH in the conflict uplink sub-frame is obtained by performing calculations using uplink Interference over Thermal (IoT), thermal noise power and uplink target Signal to Interference and Noise Ration (SINR) of the conflict uplink sub-frame; and a controller for calculating uplink transmitting power of PUSCH/PUCCH in the conflict uplink sub-frame by using the received $P_{O\_Nominal\_PUSCH\_Dyn}/P_{O\_Nominal\_PUCCH\_Dyn}$ and the $P_{O\_UE\_PUSCH\_Dyn}/P_{O\_UE\_PUCCH\_Dyn}$.

Preferably, the difference $P_{O\_Nominal\_PUSCH\_Dyn}/P_{O\_Nominal\_PUCCH\_Dyn}$ is received by the UE via a Radio Resource Control (RRC) layer message, a system broadcasting message or a physical layer message;

and/or the $P_{O\_UE\_PUSCH\_Dyn}/P_{O\_UE\_PUCCH\_Dyn}$ is received by the UE via a RRC layer message or a physical layer message.

Preferably, the RRC layer message, the system broadcasting message or the physical layer message is a customized message or a conventional message.

Still another aspect of the present invention, a User Equipment (UE) in a dynamic Time Division Duplexing (TDD) cell may include:

a receiver for receiving, from an evolved NodeB (eNB), if a UE accesses a dynamic TDD cell, a cell-specific open-loop basic working point parameter $P_{O\_Nominal\_PUSCH\_Dyn}/P_{O\_Nominal\_PUCCH\_Dyn}$ of Physical Uplink Shared Channel (PUSCH)/Physical Uplink Control Channel (PUCCH) in a conflict uplink sub-frame which is obtained by using a power control open-loop basic working point of PUSCH/PUCCH in the conflict uplink sub-frame; wherein the power control open-loop basic working point of PUSCH/PUCCH in the conflict uplink sub-frame is obtained by performing calculations using uplink Interference over Thermal (IoT), thermal noise power and uplink target Signal to Interference and Noise Ration (SINR) of the conflict uplink sub-frame; and a controller for calculating uplink transmitting power of PUSCH/PUCCH in the conflict uplink sub-frame by using the received $P_{O\_Nominal\_PUSCH\_Dyn}/P_{O\_Nominal\_PUCCH\_Dyn}$.

Preferably, the $P_{O\_Nominal\_PUSCH\_Dyn}/P_{O\_Nominal\_PUCCH\_Dyn}$ is received by the UE via a Radio Resource Control (RRC) layer message, a system broadcasting message or a physical layer message.

Preferably, the RRC layer message, the system broadcasting message or the physical layer message is a customized message or a conventional message.

Still another aspect of the present invention, a User Equipment (UE) in a dynamic Time Division Duplexing (TDD) cell may include:

a receiver for receiving, from an evolved NodeB (eNB), if a UE accesses a dynamic TDD cell, a UE-specific open-loop basic working point parameter $P_{O\_UE\_PUSCH\_Dyn}/P_{O\_UE\_PUCCH\_Dyn}$ of Physical Uplink Shared Channel (PUSCH)/Physical Uplink Control Channel (PUCCH) in a conflict uplink sub-frame which is obtained by performing calculations using a power control open-loop basic working point of PUSCH/PUCCH in the conflict uplink sub-frame and a cell-specific open-loop basic working point parameter $P_{O\_NOMINAL\_PUSCH,c}(j)/P_{O\_NOMINAL\_PUCCH,c}(j)$ of PUSCH/PUCCH in a non-conflict uplink sub-frame; wherein the power control open-loop basic working point of PUSCH/PUCCH in the conflict uplink sub-frame is obtained by performing calculations using uplink Interference over Thermal (IoT), thermal noise power and uplink target SINR of the conflict uplink sub-frame; and a controller for calculating uplink transmitting power of PUSCH/PUCCH in the conflict uplink sub-frame by using the received $P_{O\_UE\_PUSCH\_Dyn}/P_{O\_UE\_PUCCH\_Dyn}$.

Preferably, the $P_{O\_UE\_PUSCH\_Dyn}/P_{O\_UE\_PUCCH\_Dyn}$ obtained by performing calculations using the power control open-loop basic working point of PUSCH/PUCCH of the conflict uplink sub-frame and the $P_{O\_NOMINAL\_PUSCH,c}(j)/P_{O\_NOMINAL\_PUCCH}$ is obtained by:

$P_{O\_UE\_PUSCH\_Dyn}/P_{O\_UE\_PUCCH\_Dyn}$=the power control open-loop basic working point of PUSCH/PUCCH in the conflict sub-frame—$P_{O\_NOMINAL\_PUSCH,c}(j)/P_{O\_NOMINAL\_PUCCH}$.

Preferably, the $P_{O\_UE\_PUSCH\_Dyn}/P_{O\_UE\_PUCCH\_Dyn}$ is received by the UE via a Radio Resource Control (RRC) layer message or a physical layer message.

Preferably, the RRC layer message, the system broadcasting message or the physical layer message is a customized message or a conventional message.

From the above technical schemes it can be seen that according to the present invention, a UE receives from an eNB an uplink power control parameter which has been adjusted for a conflict uplink sub-frame after accessing a dynamic TDD cell. The parameter may include a difference between a power control open-loop basic working point of a conflict uplink sub-frame and a power control open-loop basic working point of a non-conflict uplink sub-frame, or a cell-specific open-loop basic working point parameter of a conflict uplink sub-frame and/or a UE-specific open-loop basic working point parameter of a conflict uplink sub-frame. The UE calculates uplink transmitting power of PUSCH/PUCCH in a conflict uplink sub-frame by using the adjusted uplink power control parameter. Therefore, since the power control parameter received by the UE has been adjusted for a conflict uplink sub-frame, rational control over uplink transmission power of PUSCH/PUCCH and accurate compensation for the interference and noise effects received on a conflict uplink sub-frame can be implemented.

BRIEF DESCRIPTION OF DRAWINGS

FIG. 2 schematically illustrates a conflict uplink sub-frame structure and a nonconflict uplink sub-frame structure in a conventional LTE-A communication system.

FIG. 3 schematically illustrates a process for controlling uplink power in LTE/LTE-A communication systems in accordance with embodiment one of the present invention.

FIG. 4 schematically illustrates a conflict uplink sub-frame structure and a nonconflict uplink sub-frame structure in LTE/LTE-A communication system in accordance with embodiment one of the present invention.

FIG. 5 schematically illustrates a process for controlling uplink power in LTE/LTE-A communication systems in accordance with embodiment two of the present invention.

FIG. 6 schematically illustrates a process for controlling uplink power in LTE/LTE-A communication systems in accordance with embodiment three of the present invention.

FIG. 7 schematically illustrates a process for controlling uplink power in LTE/LTE-A communication systems in accordance with embodiment four of the present invention.

FIG. 8 schematically illustrates an internal structure of an eNB in LTE/LTE-A communication systems according to an embodiment of the present invention.

FIG. 9 schematically illustrates an internal structure of a UE in LTE/LTE-A communication systems according to an embodiment of the present invention.

MODE FOR THE INVENTION

Figure 1:
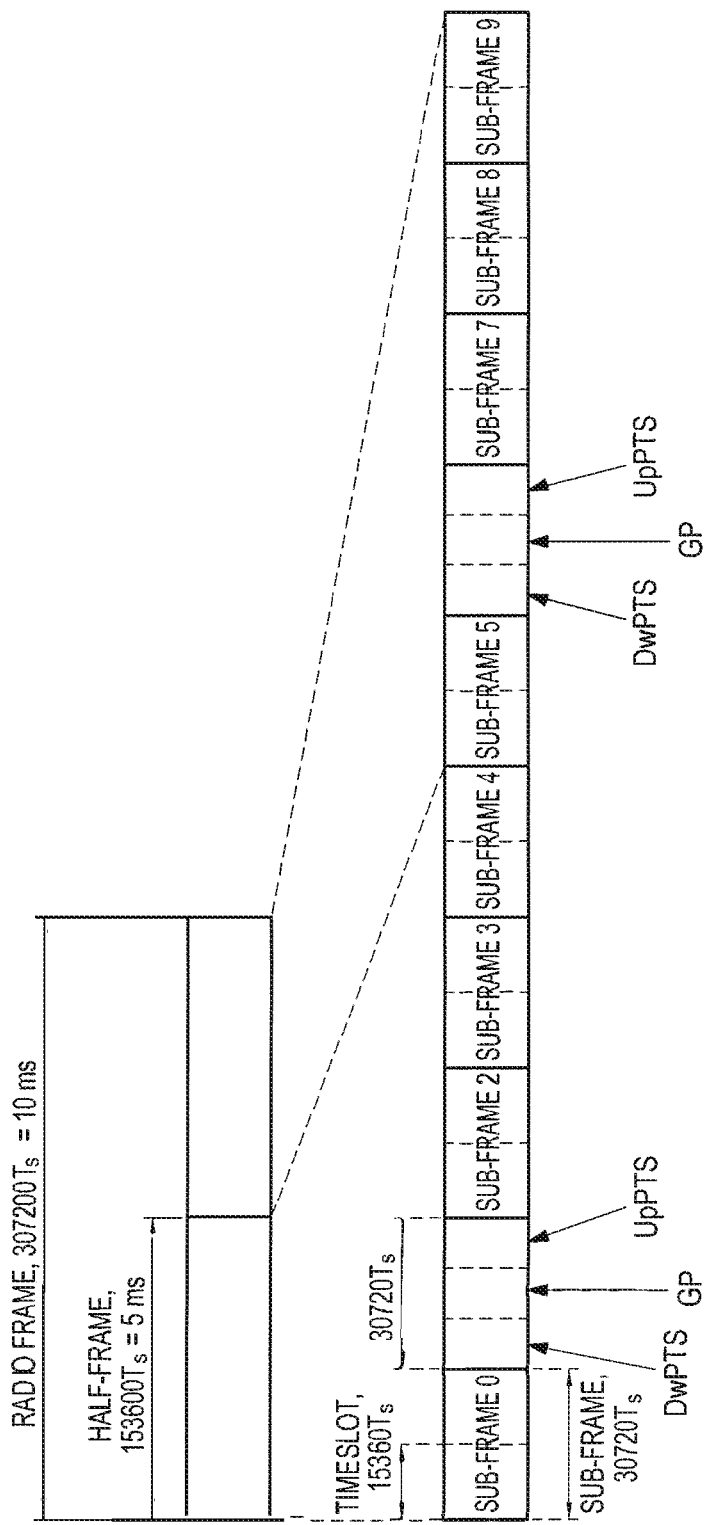
FIG. 1 schematically illustrates a frame structure in a conventional LTE TDD communication system.

In order to make the objectives, technical schemes and merits of the present invention clearer, a detailed description of the present invention is hereinafter given with reference to specific embodiments.

Embodiments of the present invention provide an apparatus and method for controlling uplink power in a communications system.

Embodiments of the present invention provide an apparatus and method for controlling uplink power in a dynamic Time Division Duplexing (TDD) cell in a communications system.

Embodiments of the present invention provide an apparatus and method for controlling transmitting power of Physical Uplink Shared Channel (PUSCH)/Physical Uplink Control Channel (PUCCH) in a conflict uplink sub-frame in a communications system.

In a dynamic TDD system, transmitting power of uplink signals in a non-conflict uplink sub-frame can be determined according to conventional methods for Long-Term Evolution (LTE)/-Term Evolution-Advanced (LTE-A). As for conflict uplink sub-frames, due to changes in interference environment, an enhanced NodeB (eNB) needs to re-configure or adjust uplink power control parameters in these sub-frames.

The main embodiment of the present invention includes: an eNB adjusts an uplink signal power control parameter to be received by a User Equipment (UE) according to interference and noise suffered by a conflict uplink sub-frame, and the UE calculates transmitting power using the adjusted parameter to counteract the interference and noise suffered by the conflict uplink sub-frame to increase a Signal to Interference and Noise Ratio (SINR) of received PUSCH/PUCCH in the conflict uplink sub-frame.

Specifically, the following embodiments provides four methods for adjusting a power control parameter for uplink signals and corresponding four methods for uplink signal power control, and the methods are described in detail hereinafter.

Embodiment One

FIG. 3 schematically illustrates a process for controlling uplink power in LTE/LTE-A communication systems in accordance with embodiment one of the present invention. As shown in FIG. 3, the method may include the following procedures.

In block 301, an eNB calculates a power control open-loop basic working point of PUSCH/PUCCH in a conflict uplink sub-frame in advance by using a uplink Interference over Thermal (IoT), thermal noise power and uplink target SINR, and calculates a difference $\Delta_{PUSCH}/\Delta_{PUCCH}$ between the power control open-loop basic working point of PUSCH/PUCCH in the conflict uplink sub-frame and a power control open-loop basic working point of PUSCH/PUCCH in a non-conflict uplink sub-frame, and stores a result of the calculations in an eNB of a dynamic TDD cell.

In conventional uplink power control schemes, a power control open-loop basic working point of an uplink signal is pre-calculated and stored in an eNB. The uplink signal may be PUSCH and/or PUCCH. The open-loop basic working point obtained is for a non-conflict uplink sub-frame, i.e. TDD UpLink-DownLink (UL/DL) configurations of adjacent cells are identical with TDD UL/DL configurations of the current cell.

In an embodiment, when the power control open-loop basic working point is calculated in advance, a power control open-loop basic working point is also calculated for a conflict uplink sub-frame. In an embodiment, the power control open-loop basic working point of a conflict uplink sub-frame is calculated by using uplink IoT, thermal noise power and uplink target SINR of the conflict uplink sub-frame. The open-loop basic working point of PUSCH in a conflict uplink sub-frame is used for PUSCH power control, and the open-loop basic working point of PUCCH in a conflict uplink sub-frame is used for PUCCH power control. The open-loop basic working point is calculated according to interference and noise suffered by the conflict uplink sub-frame. The uplink IoT and the thermal noise power are measured for the conflict uplink sub-frame, and the uplink target SINR is set for the conflict uplink sub-frame. Therefore, the open-loop basic working point obtained is adapted to the interference and noise suffered by the conflict uplink sub-frame.

Further, the open-loop basic working point obtained for a non-conflict uplink subframe (which is obtained in a conventional manner) is subtracted from the open-loop basic working point obtained for the conflict uplink sub-frame to obtain the difference $\Delta_{PUSCH}/\Delta_{PUCCH}$ between the open-loop basic working points, and the difference is stored in the eNB for power control of the conflict uplink sub-frame.

In block 302, when a UE accesses a dynamic TDD cell, the eNB sends the difference $\Delta_{PUSCH}/\Delta_{PUCCH}$ stored to the UE.

The manner of sending the difference of open-loop basic working points may be configured according to the needs, e.g. via a Radio Resource Control (RRC) layer message, a system broadcasting message or a physical layer message to the UE. The RRC layer message, the system broadcasting message or the physical layer message used for delivering the difference may be a conventional message, e.g. by using reserved bits of a conventional message to deliver the difference, and this is not limited by the present invention.

Sending manner of the open-loop basic working point of a non-conflict uplink subframe may follow a conventional manner, and is not described further herein.

In block 303, the UE receives the difference of open-loop basic working points, and uses the difference in calculating transmitting power of a signal in the conflict uplink sub-frame.

After reception of the difference, when calculating transmitting power of a signal (PUSCH or PUCCH) in the conflict uplink sub-frame, the UE adds the difference $\Delta_{PUSCH}/\Delta_{PUCCH}$ to a power control open-loop basic working point of PUSCH/PUCCH of a conflict uplink sub-frame which is obtained according to conventional calculations, and takes the result of the adding as the open-loop basic working point of the conflict uplink sub-frame which is then used for calculating the transmitting power of the signal.

Transmitting power of a signal in a non-conflict uplink sub-frame may be calculated according to a conventional method.

For example, if PUSCH and PUCCH are not transmitted in the same uplink sub-frame, the power of PUSCH in sub-frame i of the dynamic TDD cell c can be determined by using a Math Figure 3).

MathFigure 3

$$P_{PUSCH,c}(i) = \min\begin{Bmatrix} P_{CMAX,c}(i), \\ 10\log_{10}(M_{PUSCH,c}(i)) + P_{O\_PUSCH,c}(j, i) + \\ \alpha_c(j) \cdot PL_c + \Delta_{TF,c}(i) + f_c(i) \end{Bmatrix} [dBm] \quad \text{[Math. 3]}$$

wherein, $$P_{O\_PUSCH,c}(j,i) = P_{O\_NOMINAL\_PUSCH,c}(j) + P_{O\_UE\_PUSCH,c}(j) + P_{O\_SUBFRAME\_PUSCH,c}(i).$$

$$P_{O\_SUBFRAME\_PUSCH,c}(i) = \begin{cases} \Delta_{PUSCH}, & \text{sub-frame } i \text{ is a conflict uplink sub-frame} \\ 0, & \text{sub-frame } i \text{ is a non-conflict uplink sub-frame} \end{cases};$$

As expressed in Math Figure 3), by introducing parameter $$P_{O\_SUBFRAME\_PUSCH,c}(i),$$

a unified representation of open-loop basic working point for both conflict and nonconflict uplink sub-frames of PUSCH is obtained.

The power of PUCCH in sub-frame i of the current dynamic TDD cell c can be determined by a following Math Figure 4):

MathFigure 4

$$P_{PUCCH}(i) = \min\begin{Bmatrix} P_{CMAX,c}(i), \\ P_{O\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBm] \quad \text{[Math. 4]}$$

wherein, $$P_{O\_PUCCH}(i) = P_{O\_NOMINAL\_PUCCH} + P_{O\_UE\_PUCCH} + P_{O\_SUBFRAME\_PUCCH}(i)$$

$$P_{O\_SUBFRAME\_PUSCH,c}(i) = \begin{cases} \Delta_{PUSCH}, & \text{sub-frame } i \text{ is a conflict uplink sub-frame} \\ 0, & \text{sub-frame } i \text{ is a nonconflict uplink sub-frame} \end{cases};$$

As expressed in formula (4), by introducing parameter $$P_{O\_SUBFRAME\_PUCCH}(i),$$

a unified representation of open-loop basic working point of PUCCH for both conflict and non-conflict uplink sub-frames is obtained.

Hence, the process of the method for uplink power control of this embodiment is completed. In the above process, the difference of open-loop basic working points sent by the eNB is used for the UE to adjust the open-loop basic working point of a conflict uplink sub-frame. Therefore, rational power control and comprehensive compensation for special interference and noise affecting the conflict uplink sub-frame are implemented.

The above process is further described through several examples.

For example, in FIG. 2, when a dynamic TDD cell adopts TDD UL/DL configuration 2 while adjacent cells adopt TDD UL/DL configuration 1, sub-frames 3 and 8 of the dynamic TDD cell are conflict sub-frames, and the eNB sends $$P_{O\_SUBFRAME\_PUSCH,c}(i)$$

and $$P_{O\_SUBFRAME\_PUCCH}(i)$$

to the UE via an RRC layer message, a system broadcasting message or a physical layer message. After receiving the $$P_{O\_SUBFRAME\_PUSCH,c}(i)$$

and $$P_{O\_SUBFRAME\_PUCCH}(i),$$

the UE adds the difference $$\Delta_{PUSCH}/\Delta_{PUCCH}$$

of open-loop basic working points when calculating the power of PUSCH and/or PUCCH in sub-frames 3 and 8, and $$P_{O\_SUBFRAME\_PUSCH,c}(i) = \begin{cases} \Delta_{PUSCH}, & i = 3, 8 \\ 0, & i = 2, 7 \end{cases},$$

$$P_{O\_SUBFRAME\_PUCCH}(i) = \begin{cases} \Delta_{PUCCH}, & i = 3, 8 \\ 0, & i = 2, 7 \end{cases}.$$

FIG. 4 schematically illustrates a conflict uplink sub-frame structure and a nonconflict uplink sub-frame structure in LTE/LTE-A communication system in accordance with embodiment one of the present invention.

Referring to FIG. 4, when a dynamic TDD cell adopts TDD UL/DL configuration 0 while adjacent cells adopt TDD UL/DL configuration 5, sub-frames 3, 4, 7, 8 and 9 of the dynamic TDD cell are conflict sub-frames, and the eNB sends $$P_{O\_SUBFRAME\_PUSCH,c}(i)$$

and $$P_{O\_SUBFRAME\_PUCCH}(i)$$

to the UE via an RRC layer message, a system broadcasting message or a physical layer message. After receiving the $$P_{O\_SUBFRAME\_PUSCH,c}(i)$$

and $$P_{O\_SUBFRAME\_PUCCH}(i),$$

the UE adds the difference $$\Delta_{PUSCH}/\Delta_{PUCCH}$$

of open-loop basic working points when calculating the power of PUSCH and/or PUCCH in sub-frames 3, 4, 7, 8 and 9, and $$P_{O\_SUBFRAME\_PUSCH,c}(i) = \begin{cases} \Delta_{PUSCH}, & i = 3, 4, 7, 8, 9 \\ 0, & i = 2 \end{cases},$$

$$P_{O\_SUBFRAME\_PUCCH}(i) = \begin{cases} \Delta_{PUCCH}, & i = 3, 4, 7, 8, 9 \\ 0, & i = 2 \end{cases}.$$

As described above, in embodiment one, only the difference of open-loop basic working points, whose value is relatively very small, needs to be sent. Thus, adjustment of the power control parameter can be implemented with relatively very small amount of data transmitted, thereby power control of uplink signals can be more rational and waste of downlink channel resources is avoided.

Embodiment Two

FIG. 5 schematically illustrates a process for controlling uplink power in LTE/LTE-A communication systems in accordance with embodiment two of the present invention. As shown in FIG. 5, the method may include the following procedures. In block 501, a power control open-loop basic working point of PUSCH/PUCCH in a conflict uplink sub-frame is calculated by using uplink IoT, thermal noise power and uplink target SINR of the conflict uplink sub-frame.

The calculation of the open-loop basic working point of the conflict uplink sub-frame in this block is the same with that in block 301 of embodiment one, and will not be described further here.

In block 502, for a UE accessing the dynamic TDD cell, an eNB calculates a cell-specific open-loop basic working point parameter $$P_{O\_Nominal\_PUSCH\_Dyn}/P_{O\_Nominal\_PUCCH\_Dyn}$$

and a UE-specific open-loop basic working point parameter $$P_{O\_UE\_PUSCH\_Dyn}/P_{O\_UE\_PUCCH\_Dyn}$$

of PUSCH/PUCCH of the conflict uplink sub-frame by using the open-loop basic working point calculated in block 501.

In an embodiment, the cell-specific open-loop basic working point parameter and the UE-specific open-loop basic working point parameter are calculated in a manner similar to a conventional manner but taking the open-loop basic working point of the conflict uplink sub-frame stored in block 501 as the open-loop basic working point. Therefore, the sum of the cell-specific open-loop basic working point parameter and the UE-specific open-loop basic working point parameter equals the open-loop basic working point of the conflict uplink sub-frame stored in block 501.

In block 503, the eNB sends the cell-specific open-loop basic working point parameter $$P_{O\_Nominal\_PUSCH\_Dyn}/P_{O\_Nominal\_PUCCH\_Dyn}$$

and the UE-specific open-loop basic working point parameter $$P_{O\_UE\_PUSCH\_Dyn}/P_{O\_UE\_PUCCH\_Dyn}$$

obtained in block 502 to the UE.

The manner of sending the cell-specific open-loop basic working point parameter $$P_{O\_Nominal\_PUSCH\_Dyn}/P_{O\_Nominal\_PUCCH\_Dyn}$$

and the UE-specific open-loop basic working point parameter $$P_{O\_UE\_PUSCH\_Dyn}/P_{O\_UE\_PUCCH\_Dyn}$$

may be arbitrarily configured according to the needs. For example, the cell-specific open-loop basic working point parameter $$P_{O\_Nominal\_PUSCH\_Dyn}/P_{O\_Nominal\_PUCCH\_Dyn}$$

is universal for all UEs in the cell, and therefore can be sent via an RRC layer message, a system broadcast message or a physical layer message, etc. The UE-specific open-loop basic working point parameter $$P_{O\_UE\_PUSCH\_Dyn}/P_{O\_UE\_PUCCH\_Dyn}$$

may be different for different UEs, and therefore may be sent via an RRC message or a physical layer message. The message for delivering the cell-specific open-loop basic working point parameter or the UE-specific open-loop basic working point parameter may be a conventional message or a customized message, and is not limited in the present invention.

In block 504, the UE receives the cell-specific open-loop basic working point parameter $$P_{O\_Nominal\_PUSCH\_Dyn}/P_{O\_Nominal\_PUCCH\_Dyn}$$

and the UE-specific open-loop basic working point parameter $$P_{O\_UE\_PUSCH\_Dyn}/P_{O\_UE\_PUCCH\_Dyn},$$

and uses the $$P_{O\_Nominal\_PUSCH\_Dyn}/P_{O\_Nominal\_PUCCH\_Dyn}$$

and the $$P_{O\_UE\_PUSCH\_Dyn}/P_{O\_UE\_PUCCH\_Dyn}$$

in calculating transmitting power of a signal in the conflict uplink sub-frame.

After receiving the $$P_{O\_Nominal\_PUSCH\_Dyn}/P_{O\_Nominal\_PUCCH\_Dyn}$$

and the $$P_{O\_UE\_PUSCH\_Dyn}/P_{O\_UE\_PUCCH\_Dyn},$$

the UE uses the sum of the $$P_{O\_Nominal\_PUSCH\_Dyn}/P_{O\_Nominal\_PUCCH\_Dyn}$$

and the $$P_{O\_UE\_PUSCH\_Dyn}/P_{O\_UE\_PUCCH\_Dyn}$$

as the open-loop basic working point of the conflict uplink sub-frame in calculating the transmitting power of a signal in the conflict uplink sub-frame. As mentioned in block 502, the sum of the two parameters equals the open-loop basic working point obtained in block 501, i.e. is consistent with the open-loop basic working point of noise and interference in the conflict uplink sub-frame. Therefore, using the open-loop basic working point in calculating signal transmitting power enables adaptation to noise and interference in the conflict uplink sub-frame and rational control over signal transmitting power.

Transmitting power of a signal in a non-conflict uplink sub-frame may be calculated according to a conventional method.

For example, if PUSCH and PUCCH are not transmitted in the same uplink sub-frame, the power of PUSCH in sub-frame i of a dynamic TDD cell c can be determined by using a Math Figure 5).

MathFigure 5

[Math. 5]

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j,i) + \\ \alpha_c(j) \cdot PL_c + \Delta_{TF,c}(i) + f_c(i) \end{array}\right\} [dBm]$$

wherein, $$P_{O\_PUSCH,c}(j,i) = P_{O\_NOMINAL\_PUSCH,c}(j,i) + P_{O\_UE\_PUSCH,c}(j,i)$$

$$P_{O\_NOMINAL\_PUSCH,c}(j,i) = \begin{cases} P_{O\_NOMINAL\_PUSCH\_Dyn}, & \text{sub-frame } i \text{ is a conflict uplink sub-frame} \\ P_{O\_NOMINAL\_PUSCH,c}(j), & \text{sub-frame } i \text{ is a non-conflict uplink sub-frame} \end{cases}$$

$$P_{O\_UE\_PUSCH,c}(j,i) = \begin{cases} P_{O\_UE\_PUSCH\_Dyn}, & \text{sub-frame } i \text{ is a conflict uplink sub-frame} \\ P_{O\_UE\_PUSCH,c}(j), & \text{sub-frame } i \text{ is a non-conflict uplink sub-frame} \end{cases}$$

As expressed in formula (5), by introducing the parameters $$P_{O\_PUSCH,c}(j,i),$$

$$P_{O\_NOMINAL\_PUSCH,c}(j,i)$$

and $$P_{O\_UE\_PUSCH,c}(j,i),$$

a unified expression can be obtained for open-loop basic working points of PUSCH, cell-specific open-loop basic working point of PUSCH and UE-specific open-loop basic working point of PUSCH in both conflict and non-conflict uplink sub-frames.

The power of PUCCH in sub-frame i of the current dynamic TDD cell c can be determined by a Math Figure 6).

MathFigure 6

[Math. 6]

$$P_{PUCCH}(i) = \min \begin{cases} P_{CMAX,c}(i), \\ P_{O\_PUCCH}(i) + PL_c + h(n_{CQI}, n_{HARQ}, n_{SR}) + \\ \Delta_{F\_PUCCH}(F) + \Delta_{TxD}(F') + g(i) \end{cases} [dBm]$$

$$P_{O\_PUCCH}(i) = P_{O\_NOMINAL\_PUCCH}(i) + P_{O\_UE\_PUCCH}(i).$$

$$P_{O\_NOMINAL\_PUCCH}(i) = \begin{cases} P_{O\_NOMINAL\_PUCCH\_Dyn}, & \text{sub-frame } i \text{ is a conflict uplink sub-frame} \\ P_{O\_NOMINAL\_PUCCH}, & \text{sub-frame } i \text{ is a non-conflict uplink sub-frame} \end{cases}$$

$$P_{O\_UE\_PUCCH}(i) = \begin{cases} P_{O\_UE\_PUCCH\_Dyn}, & \text{sub-frame } i \text{ is a conflict uplink sub-frame} \\ P_{O\_UE\_PUCCH}, & \text{sub-frame } i \text{ is a non-conflict uplink sub-frame} \end{cases}$$

As expressed in formula (6), by introducing the parameters $$P_{O\_PUCCH}(i),$$

$$P_{O\_NOMINAL\_PUCCH}(i)$$

and $$P_{O\_UE\_PUCCH}(i),$$

a unified expression can be obtained for open-loop basic working points of PUSCH, cell-specific open-loop basic working point of PUSCH and LTE-specific open-loop basic working point of PUSCH in both conflict and non-conflict uplink sub-frames.

Hence, the process of the method for uplink power control of this embodiment is completed. In the above technical scheme, the UE-specific open-loop basic working point parameter for a conflict uplink sub-frame sent by the eNB enables the UE to adjust the open-loop basic working point of the conflict uplink sub-frame, which implements more rational power control and better compensation for special interference and noise suffered by the conflict uplink sub-frame.

The above process is further described through several examples.

For example, in FIG. 2, when a dynamic TDD cell adopts TDD UL/DL configuration 2 while adjacent cells adopt TDD UL/DL configuration 1, sub-frames 3 and 8 of the dynamic IDD cell are conflict sub-frames, and the eNB sends $$P_{O\_Nominal\_PUSCH\_Dyn}$$

and $$P_{O\_Nominal\_PUCCH\_Dyn}$$

to the UE via a system broadcasting message, and sends $$P_{O\_UE\_PUSCH\_Dyn}$$

and $$P_{O\_UE\_PUCCH\_Dyn}$$

to the UE via an RRC layer signaling message. After receiving the parameters, the UE uses the parameters for calculating open-loop basic working point when calculating the power of PUSCH and/or PUCCH in sub-frames 3 and 8, and $$P_{O\_NOMINAL\_PUSCH,c}(j, i) = \begin{cases} P_{O\_NOMINAL\_PUSCH\_Dyn}, & i = 3, 8 \\ P_{O\_NOMINAL\_PUSCH,c}(j), & i = 2, 7 \end{cases},$$

$$P_{O\_UE\_PUSCH,c}(j, i) = \begin{cases} P_{O\_UE\_PUSCH\_Dyn}, & i = 3, 8 \\ P_{O\_UE\_PUSCH,c}(j), & i = 2, 7 \end{cases},$$

$$P_{O\_NOMINAL\_PUCCH}(i) = \begin{cases} P_{O\_NOMINAL\_PUCCH\_Dyn}, & i = 3, 8 \\ P_{O\_NOMINAL\_PUCCH}, & i = 2, 7 \end{cases},$$

$$P_{O\_UE\_PUCCH}(i) = \begin{cases} P_{O\_UE\_PUCCH\_Dyn}, & i = 3, 8 \\ P_{O\_UE\_PUCCH}, & i = 2, 7 \end{cases}.$$

For example, in FIG. 4, when a dynamic TDD cell adopts TDD UL/DL configuration 0 while adjacent cells adopt IDD UL/DL configuration 5, sub-frames 3, 4, 7, 8 and 9 of the dynamic TDD cell are conflict sub-frames, and the eNB sends $$P_{O\_Nominal\_PUSCH\_Dyn}$$

and $$P_{O\_Nominal\_PUCCH\_Dyn}$$

to the UE via a system broadcasting message, and sends $$P_{O\_UE\_PUSCH\_Dyn}$$

and $$P_{O\_UE\_PUCCH\_Dyn}$$

to the UE via an RRC layer signaling message. After receiving the parameters, the UE uses the parameters for calculating open-loop basic working point when calculating the power of PUSCH and/or PUCCH in sub-frames 3, 4, 7, 8 and 9, and $$P_{O\_NOMINAL\_PUSCH,c}(j, i) = \begin{cases} P_{O\_NOMINAL\_PUSCH\_Dyn}, & i = 3, 4, 7, 8, 9 \\ P_{O\_NOMINAL\_PUSCH,c}(j), & i = 2 \end{cases},$$

$$P_{O\_UE\_PUSCH,c}(j, i) = \begin{cases} P_{O\_UE\_PUSCH\_Dyn}, & i = 3, 4, 7, 8, 9 \\ P_{O\_UE\_PUSCH,c}(j), & i = 2 \end{cases},$$

$$P_{O\_NOMINAL\_PUCCH}(i) = \begin{cases} P_{O\_NOMINAL\_PUCCH\_Dyn}, & i = 3, 4, 7, 8, 9 \\ P_{O\_NOMINAL\_PUCCH}, & i = 2 \end{cases},$$

$$P_{O\_UE\_PUCCH}(i) = \begin{cases} P_{O\_UE\_PUCCH\_Dyn}, & i = 3, 4, 7, 8, 9 \\ P_{O\_UE\_PUCCH}, & i = 2 \end{cases}.$$

In embodiment two, the cell-specific open-loop basic working point parameter and the UE-specific open-loop basic working point parameter of the conflict uplink sub-frame need to be sent to UE via extra signaling. In fact, the UE-specific open-loop basic working point parameter is mainly related with LIE capabilities, so the changes in open-loop basic working point of the conflict uplink sub-frame have little impact on UE-specific open-loop basic working point parameter. Therefore, another embodiment is provided to reduce extra data transmission and downlink resource occupation.

Embodiment Three

In this embodiment, cell-specific open-loop basic working point parameter is adjusted merely based on the open-loop basic working point of the conflict uplink subframe and is sent to the UE.

FIG. 6 schematically illustrates a process for controlling uplink power in LTE/LTE-A communication systems in accordance with embodiment three of the present invention. As shown in FIG. 6, the method may include the following procedures in block 601, a power control open-loop basic working point of PUSCH/PUCCH in a conflict uplink sub-frame is calculated by using uplink IoT, thermal noise power and uplink target SINR of the conflict uplink sub-frame.

Procedures in this block are the same as block 501, and will not be elaborated herein.

In block 602, the eNB calculates a cell-specific open-loop basic working point parameter $$P_{O\_Nominal\_PUSCH\_Dyn}/P_{O\_Nominal\_PUCCH\_Dyn}$$

of PUSCH/PUCCH in a conflict uplink sub-frame by using the open-loop basic working point obtained and stored in block 601.

The calculations of the cell-specific open-loop basic working point in this block are the same with those in block 502, and will not be described further here.

The UE-specific open-loop basic working point parameter of PUSCH/PUCCH in the conflict uplink sub-frame is the same with that of a non-conflict uplink sub-frame.

In block 603, the eNB sends the cell-specific open-loop basic working point parameter $$P_{O\_Nominal\_PUSCH\_Dyn}/P_{O\_Nominal\_PUCCH\_Dyn}$$

obtained in block 602 to a UE accessing the dynamic TDD cell.

The manner of sending the cell-specific open-loop basic working point parameter $$P_{O\_Nominal\_PUSCH\_Dyn}/P_{O\_Nominal\_PUCCH\_Dyn}$$

can be configured according to the needs. For example, the parameter may be delivered via an RRC layer message, a system broadcast message or a physical layer message, and so on. The message for delivering the cell-specific open-loop basic working point parameter may be a conventional message or a customized message, and is not limited in the present invention.

In block 604, the UE receives the cell-specific open-loop basic working point parameter $$P_{O\_Nominal\_PUSCH\_Dyn}/P_{O\_Nominal\_PUCCH\_Dyn},$$

and uses the $$P_{O\_Nominal\_PUSCH\_Dyn}/P_{O\_Nominal\_PUCCH\_Dyn}$$

in calculating transmitting power of a signal in the conflict uplink sub-frame.

After receiving the $$P_{O\_Nominal\_PUSCH\_Dyn}/P_{O\_Nominal\_PUCCH\_Dyn},$$

the UE uses the sum of the $$P_{O\_Nominal\_PUSCH\_Dyn}/P_{O\_Nominal\_PUCCH\_Dyn}$$

and a UE-specific open-loop basic working point parameter $$P_{O\_UE\_PUSCH,c}(j)/P_{O\_UE\_PUCCH}$$

of a non-conflict uplink sub-frame as the open-loop basic working point of the conflict uplink sub-frame in calculating the transmitting power of a signal in the conflict uplink sub-frame. As stated in the above, the UE-specific open-loop basic working point parameter $$P_{O\_UE\_PUSCH,c}(j)/P_{O\_UE\_PUCCH}$$

is mainly related with UE capabilities, and changes in open-loop basic working point of the conflict uplink sub-frames have little impact on the UE-specific open-loop basic working point parameter, therefore, the sum of $$P_{O\_Nominal\_PUSCH\_Dyn}/P_{O\_Nominal\_PUCCH\_Dyn}$$

and $$P_{O\_UE\_PUSCH,c}(j)/P_{O\_UE\_PUCCH}$$

can be regarded as the open-loop basic working point in block 601. Using the sum in calculating signal transmitting power enables better adaptation to noise and interference suffered by the conflict uplink sub-frame and implements rational control over signal transmitting power.

Transmitting power of a signal in a non-conflict uplink sub-frame may be calculated according to a conventional method.

For example, if PUSCH and PUCCH are not transmitted in the same uplink sub-frame, the power of PUSCH in sub-frame i of the dynamic TDD cell c can be determined by using a Math Figure 7).

MathFigure 7

[Math. 7]

$$P_{PUSCH,c}(i) = \min\begin{cases} P_{CMAX,c}(i), \\ 10\log_{10}(M_{PUSCH,c}(i)) + P_{O\_PUSCH,c}(j,i) + \\ \alpha_c(j) \cdot PL_c + \Delta_{TF,c}(i) + f_c(i) \end{cases} [dBm].$$

wherein, $$P_{O\_PUSCH,c}(j,i) = P_{O\_NOMINAL\_PUSCH,c}(j,i) + P_{O\_UE\_PUSCH,c}(j).$$

$$P_{O\_NOMINAL\_PUSCH,c}(j, i) =$$

$$\begin{cases} P_{O\_NOMINAL\_PUSCH\_Dyn}, & \text{sub-frame } i \text{ is a conflict uplink sub-frame} \\ P_{O\_NOMINAL\_PUSCH,c}(j), & \text{sub-frame } i \text{ is a non-conflict uplink sub-frame} \end{cases}$$

Therefore, as expressed in formula (7), by introducing parameters $$P_{O\_PUSCH,c}(j,i)$$

and $$P_{O\_NOMINAL\_PUSCH,c}(j,i),$$

a unified expression can be obtained for open-loop basic working point and cell-specific open-loop basic working point of PUSCH in both conflict and non-conflict uplink sub-frames.

The power of PUCCH in sub-frame i of the current dynamic TDD cell c can be determined by a Math Figure 8).

MathFigure 8

[Math. 8]
$$P_{PUCCH}(i) = \min\begin{cases} P_{CMAX,c}(i), \\ P_{O\_PUCCH}(i) + PL_c + h(n_{CQI}, n_{HARQ}, n_{SR}) + \\ \Delta_{F\_PUCCH}(F) + \Delta_{TxD}(F') + g(i) \end{cases} [dBm]$$

wherein, $P_{O\_PUCCH}(i) = P_{O\_NOMINAL\_PUCCH} + P_{O\_UE\_PUCCH}.$ $$P_{O\_NOMINAL\_PUCCH}(i) = \begin{cases} P_{O\_NOMINAL\_PUCCH\_Dyn}, & \text{sub-frame } i \text{ is a conflict uplink sub-frame} \\ P_{O\_NOMINAL\_PUCCH}, & \text{sub-frame } i \text{ is a non-conflict uplink sub-frame} \end{cases}$$

Therefore, as expressed in formula (8), by introducing parameters $P_{O\_PUCCH}(i)$ and $P_{O\_NOMINAL\_PUCCH}(i)$, a unified expression can be obtained for open-loop basic working point and cell-specific open-loop basic working point of PUCCH in both conflict and non-conflict uplink sub-frames.

Hence, the process of the method for uplink power control of this embodiment is completed. In the above technical scheme, the UE-specific open-loop basic working point parameter for a conflict uplink sub-frame sent by the eNB enables the UE to adjust the open-loop basic working point of the conflict uplink sub-frame, which implements more rational power control and better compensation for special interference and noise suffered by the conflict uplink sub-frame.

In the above embodiment three, the cell-specific open-loop basic working point parameter of the conflict uplink sub-frame may be sent using a system broadcasting message. But system broadcasting messages are well-defined, which makes it difficult to use conventional system broadcasting messages or use newly defined system broadcasting messages. Thus, an embodiment four is provided to reflect the changes in cell-specific open-loop basic working point parameter of the conflict uplink sub-frame by using changes in UE-specific open-loop basic working point parameter.

Embodiment Four

FIG. 7 schematically illustrates a process for controlling uplink power in LTE/LTE-A communication systems in accordance with embodiment four of the present invention. As shown in FIG. 7, the method may include the following procedures. In block 701, a power control open-loop basic working point of PUSCH/PUCCH in a conflict uplink sub-frame is calculated by using uplink IoT, thermal noise power and uplink target SINR of the conflict uplink sub-frame, and is stored in an eNB.

Procedures in this block are the same as block 501, and will not be elaborated herein.

In block 702, an eNB calculates a UE-specific open-loop basic working point parameter $P_{O\_UE\_PUSCH\_Dyn}/P_{O\_UE\_PUCCH\_Dyn}$ of PUSCH/PUCCH in the conflict uplink sub-frame by using the open-loop basic working point calculated in block 701 and a cell-specific open-loop basic working point parameter $P_{O\_Nominal\_PUSCH,c}(j)/P_{O\_Nominal\_PUCCH}.$ The cell-specific open-loop basic working point parameter of PUSCH/PUCCH in the conflict uplink sub-frame is the same with that of a non-conflict uplink sub-frame.

As mentioned above, the power control open-loop basic working point, the cell-specific open-loop basic working point parameter and the UE-specific open-loop basic working point parameter have fixed inherent relationship with each other, and the open-loop basic working point of a conflict uplink sub-frame is determined in block 701. Therefore, the changes which were to be made to the cell-specific open-loop basic working point parameter of the conflict uplink sub-frame are made to the UE-specific open-loop basic working point parameter based on the fixed inherent relationship between the power control open-loop basic working point, the cell-specific open-loop basic working point parameter and the UE-specific open-loop basic working point parameter. Preferably, the UE-specific open-loop basic working point parameter of the conflict uplink sub-frame may be set to be the difference between the open-loop basic working point obtained in block 701 and the cell-specific basic working point of a nonconflict uplink sub-frame.

In block 703, the eNB sends the UE-specific open-loop basic working point parameter $P_{O\_UE\_PUSCH\_Dyn}/P_{O\_UE\_PUCCH\_Dyn}$ obtained in block 702 to a UE accessing the dynamic TDD cell.

The manner of sending the UE-specific open-loop basic working point $P_{O\_UE\_PUSCH\_Dyn}/P_{O\_UE\_PUCCH\_Dyn}$ can be configured according to the needs. For example, the parameter may be delivered via an RRC layer message or a physical layer message or the like. The message for delivering the cell-specific open-loop basic working point parameter may be a conventional message or a customized message, and is not limited in the present invention.

In block 704, the UE receives the cell-specific open-loop basic working point parameter $P_{O\_UE\_PUSCH\_Dyn}/P_{O\_UE\_PUCCH\_Dyn},$ and uses the $P_{O\_UE\_PUSCH\_Dyn}/P_{O\_UE\_PUCCH\_Dyn}$ in calculating transmitting power of a signal in the conflict uplink sub-frame.

After receiving the $P_{O\_UE\_PUSCH\_Dyn}/P_{O\_UE\_PUCCH\_Dyn},$ the UE uses the $$P_{O\_UE\_PUSCH\_Dyn}/P_{O\_UE\_PUCCH\_Dyn}$$

in calculating signal transmitting power of the conflict uplink sub-frame.

As mentioned above, the UE-specific open-loop basic working point parameter $$P_{O\_UE\_PUSCH\_Dyn}/P_{O\_UE\_PUCCH\_Dyn}$$

reflects the changes which were to be made to the cell-specific open-loop basic working point parameter of the conflict uplink sub-frame, therefore, the signal transmitting power calculated by using the UE-specific open-loop basic working point parameter $$P_{O\_UE\_PUSCH\_Dyn}/P_{O\_UE\_PUCCH\_Dyn}$$

is suitable for interference and noise suffered by the conflict uplink sub-frame, thus realizes better power control.

Transmitting power of a signal in a non-conflict uplink sub-frame may be calculated according to a conventional method.

For example, if PUSCH and PUCCH are not transmitted in the same uplink sub-frame, the power of PUSCH in sub-frame i of the dynamic TDD cell c can be determined by using a Math Figure 9).

MathFigure 9

$$P_{PUSCH,c}(i) = \min \begin{cases} P_{CMAX,c}(i), \\ 10\log_{10}(M_{PUSCH,c}(i)) + P_{O\_PUSCH,c}(j, i) + \\ \alpha_c(j) \cdot PL_c + \Delta_{TF,c}(i) + f_c(i) \end{cases} \text{[dBm]}.$$

[Math. 9]

wherein, $$P_{O\_PUSCH,c}(j,i) = P_{O\_NOMINAL\_PUSCH,c}(j) + P_{O\_UE\_PUSCH,c}(j,i).$$

$$P_{O\_UE\_PUSCH,c}(j, i) = \begin{cases} P_{O\_UE\_PUSCH\_Dyn}, & \text{sub-frame } i \text{ is a conflict uplink sub-frame} \\ P_{O\_UE\_PUSCH,c}(j), & \text{sub-frame } i \text{ is a non-conflict uplink sub-frame} \end{cases}$$

Therefore, as expressed in a formula (9), by introducing parameters $$P_{O\_PUSCH,c}(j,i)$$

and $$P_{O\_UE\_PUSCH,c}(j,i),$$

a unified expression can be obtained for open-loop basic working point and UE-specific open-loop basic working point of PUSCH in both conflict and non-conflict uplink sub-frames.

The power of PUCCH in sub-frame i of the current dynamic TDD cell c can be determined by a Math Figure 10):

MathFigure 10

$$P_{PUCCH}(i) = \min \begin{cases} P_{CMAX,c}(i), \\ P_{O\_PUCCH}(i) + PL_c + h(n_{CQI}, n_{HARQ}, n_{SR}) + \\ \Delta_{F\_PUCCH}(F) + \Delta_{TxD}(F') + g(i) \end{cases} \text{[dBm]}$$

[Math. 10]

wherein, $$P_{O\_PUCCH}(i) = P_{O\_NOMINAL\_PUCCH} + P_{O\_UE\_PUCCH}(i).$$

$$P_{O\_UE\_PUCCH}(i) = \begin{cases} P_{O\_UE\_PUCCH\_Dyn}, & \text{sub-frame } i \text{ is a conflict uplink sub-frame} \\ P_{O\_UE\_PUCCH}, & \text{sub-frame } i \text{ is a non-conflict uplink sub-frame} \end{cases}$$

Therefore, as expressed in a formula (10), by introducing parameters $$P_{O\_PUCCH}(i)$$

and $$P_{O\_UE\_PUCCH}(i),$$

a unified expression can be obtained for open-loop basic working point and UE-specific open-loop basic working point of PUCCH in both conflict and non-conflict uplink sub-frames.

Hence, the process of the method for uplink power control of this embodiment is completed. In the above technical scheme, the UE-specific open-loop basic working point parameter for a conflict uplink sub-frame sent by the eNB enables the UE to adjust the open-loop basic working point of the conflict uplink sub-frame, which implements more rational power control and better compensation for special interference and noise suffered by the conflict uplink sub-frame.

FIG. 8 schematically illustrates an internal structure of an eNB in LTE/LTE-A communication systems according to an embodiment of the present invention.

Referring to FIG. 8, an eNB 800 includes a receiver 811, a controller 813, a transmitter 815, and a storage unit 817.

The controller 813 controls the overall operation of the eNB 800, specially controls the eNB 800 to perform an operation of controlling uplink power, i.e., an operation related to control uplink power in a dynamic TDD cell according to an embodiment of the present invention. The operation of controlling uplink power is performed in the manner described before with reference to FIGS. 3 to 7, so the detailed description will be omitted herein. The receiver 811 receives signals from a UE under a control of the controller 813. The signals received in the receiver 811 are described before with reference to FIGS. 3 to 7, so the detailed description will be omitted herein. The transmitter 815 transmits signals to the UE under a control of the controller 813. The signals transmitted in the transmitter 815 are described before with reference to FIGS. 3 to 7, so the detailed description will be omitted herein. The storage unit 817 stores the signals received by the receiver 811 and data for an operation of the eNB 800, e.g., information related to the operation of controlling the uplink power, i.e., the operation related to control the uplink power in the dynamic TDD cell. While the receiver 811, the controller 813, the transmitter 815, and the storage unit 817 are shown in FIG. 8 as separate units, it is to be understood that this is for merely convenience of description. In other words, the receiver 811, the controller 813, the transmitter 815, and the storage unit 817 may be incorporated into a single unit.

FIG. 9 schematically illustrates an internal structure of a UE in LTE/LTE-A communication systems according to an embodiment of the present invention.

Referring to FIG. 9, a UE 900 includes a receiver 911, a controller 913, a transmitter 915, and a storage unit 917.

The controller 913 controls the overall operation of the LTE 900, specially controls the UE 900 to perform an operation of controlling uplink power, i.e., an operation related to control uplink power in a dynamic TDD cell according to an embodiment of the present invention. The operation of controlling uplink power is performed in the manner described before with reference to FIGS. 3 to 7, so the detailed description will be omitted herein. The receiver 911 receives signals from an eNB under a control of the controller 913. The signals received in the receiver 911 are described before with reference to FIGS. 3 to 7, so the detailed description will be omitted herein. The transmitter 915 transmits signals to the eNB under a control of the controller 913. The signals transmitted in the transmitter 915 are described before with reference to FIGS. 3 to 7, so the detailed description will be omitted herein.

The storage unit 917 stores the signals received by the receiver 911 and data for an operation of the UE 900, e.g., information related to the operation of controlling the uplink power, i.e., the operation related to control the uplink power in the dynamic TDD cell.

While the receiver 911, the controller 913, the transmitter 915, and the storage unit 917 are shown in FIG. 9 as separate units, it is to be understood that this is for merely convenience of description. In other words, the receiver 911, the controller 913, the transmitter 915, and the storage unit 917 may be incorporated into a single unit.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method for uplink power control by a user equipment (UE) in a wireless communication system, the method comprising:

receiving, from a base station, time division duplexing (TDD) uplink-downlink (UL-DL) configuration information, first signaling information indicating an uplink subframe set including at least one uplink subframe from among uplink subframes that are identified by the TDD UL-DL configuration information for a serving cell, a first parameter set for uplink power control of the uplink subframe set and a second parameter set for uplink power control, wherein an uplink subframe in the uplink subframe set conflicts with a downlink subframe in a neighbor cell;

determining whether a subframe belongs to the uplink subframe set identified by the first signaling information;

when the subframe belongs to the uplink subframe set, determining a first transmit power for an uplink data channel based on the first parameter set and transmitting uplink data in the subframe on the uplink data channel based on the first transmit power; and when the subframe does not belong to the uplink subframe set, determining a second transmit power for the uplink data channel based on the second parameter set and transmitting uplink data in the subframe on the uplink data channel based on the second transmit power, wherein the first parameter set is calculated by using uplink interference over thermal (IoT), thermal noise power, and uplink target signal to interference and noise ratio (SINR) of the uplink subframe set, and wherein the first parameter set comprises information indicating difference between a first open-loop basic working point for an uplink subframe belonging to the uplink subframe set and a second open-loop basic working point for an uplink subframe not belonging to the uplink subframe set.

2. The method of claim 1, wherein each of the first parameter set and the second parameter set comprises a nominal transmit power and a UE-specific transmit power for the serving cell.

3. The method of claim 1, wherein the first signaling information, the first parameter set, and the second parameter set are received via a radio resource control (RRC) message.

4. The method of claim 1, wherein the first transmit power is calculated using a sum of a nominal transmit power and a UE-specific transmit power for the serving cell indicated by the first parameter set, and wherein the second transmit power is calculated using a sum of a nominal transmit power and a UE-specific transmit power for the serving cell indicated by the second parameter set.

5. A method for uplink power control by a base station in a wireless communication system, the method comprising:

transmitting, to a user equipment (UE), time division duplexing (TDD) uplink-downlink (UL-DL) configuration information, first signaling information indicating an uplink subframe set including at least one uplink subframe from among uplink subframes that are identified by the TDD UL-DL configuration information for a serving cell, a first parameter set for uplink power control of the uplink subframe set and a second parameter set for uplink power control, wherein an uplink subframe in the uplink subframe set conflicts with a downlink subframe in a neighbor cell;

receiving, from the UE, uplink data on an uplink data channel transmitted based on a first transmit power in a subframe, when the subframe belongs to the uplink subframe set identified by the first signaling information; and receiving, from the UE, uplink data on the uplink data channel transmitted based on a second transmit power in the subframe, when the subframe does not belong to the uplink subframe set identified by the first signaling information, wherein the first parameter set is calculated by using uplink interference over thermal (IoT), thermal noise power, and uplink target signal to interference and noise ratio (SINR) of the uplink subframe set, and wherein the first parameter set comprises information indicating difference between a first open-loop basic working point for an uplink subframe belonging to the uplink subframe set and a second open-loop basic working point for an uplink subframe not belonging to the uplink subframe set.

6. The method of claim 5, wherein each of the first parameter set and the second parameter set comprises a nominal transmit power and a UE-specific transmit power for the serving cell.

7. The method of claim 5, wherein the first signaling information, the first parameter set, and the second parameter set are received via a radio resource control (RRC) message.

8. The method of claim 5, wherein the first transmit power is calculated using a sum of a nominal transmit power and a UE-specific transmit power for the serving cell indicated by the first parameter set, and wherein the second transmit power is calculated by using a sum of a nominal transmit power and a UE-specific transmit power for the serving cell indicated by the second parameter set.

9. An apparatus in a user equipment (UE) for uplink power control by the UE in a wireless communication system, the apparatus comprising:
a transceiver; and
at least one processor coupled to the transceiver,
wherein the at least one processor is configured to:
receive, from a base station, time division duplexing (TDD) uplink-downlink (UL-DL) configuration information, first signaling information indicating an uplink subframe set including at least one uplink subframe from among uplink subframes that are identified by the TDD UL-DL configuration information for a serving cell, a first parameter set for uplink power control of the uplink subframe set and a second parameter set for uplink power control, wherein an uplink subframe in the uplink subframe set conflicts with a downlink subframe in a neighbor cell;
determine whether a subframe belongs to the uplink subframe set identified by the first signaling information;
when the subframe belongs to the uplink subframe set, determine a first transmit power for an uplink data channel based on the first parameter set and control a transmitter to transmit uplink data in the subframe on the uplink data channel based on the first transmit power; and
when the subframe does not belong to the uplink subframe set, determine a second transmit power for the uplink data channel based on the second parameter set and control the transmitter to transmit uplink data in the subframe on the uplink data channel based on the second transmit power, wherein the first parameter set is calculated by using uplink interference over thermal (IoT), thermal noise power, and uplink target signal to interference and noise ratio (SINR) of the uplink subframe set, and
wherein the first parameter set comprises information indicating difference between a first open-loop basic working point for an uplink subframe belonging to the uplink subframe set and a second open-loop basic working point for an uplink subframe not belonging to the uplink subframe set.

10. The apparatus of claim 9, wherein each of the first parameter set and the second parameter set comprises a nominal transmit power and a UE-specific transmit power for the serving cell.

11. The apparatus of claim 9, wherein the first signaling information, the first parameter set, and the second parameter set are received via a radio resource control (RRC) message.

12. The apparatus of claim 9, wherein the first transmit power is calculated using a sum of a nominal transmit power and a UE-specific transmit power for the serving cell indicated by the first parameter set, and wherein the second transmit power is calculated using a sum of a nominal transmit power and a UE-specific transmit power for the serving cell indicated by the second parameter set.

13. An apparatus in a base station for uplink power control in a wireless communication system, the apparatus comprising:
a transceiver; and
at least one processor coupled to the transceiver,
wherein the at least one processor is configured to:
transmit, to a user equipment (UE), time division duplexing (TDD) uplink-downlink (UL-DL) configuration information, first signaling information indicating an uplink subframe set including at least one uplink subframe from among uplink subframes that are identified by the TDD UL-DL configuration information for a serving cell, a first parameter set for uplink power control of the uplink subframe set and a second parameter set for uplink power control, wherein an uplink subframe in the uplink subframe set conflicts with a downlink subframe in a neighbor cell;
receive, from the UE, uplink data on an uplink data channel transmitted based on a first transmit power in a subframe, when the subframe belongs to the uplink subframe set identified by the first signaling information; and
receive, from the UE, uplink data on the uplink data channel transmitted based on a second transmit power in the subframe, when the subframe does not belong to the uplink subframe set identified by the first signaling information,
wherein the first parameter set is calculated by using uplink interference over thermal (IoT), thermal noise power, and uplink target signal to interference and noise ratio (SINR) of the uplink subframe set, and
wherein the first parameter set comprises information indicating difference between a first open-loop basic working point for an uplink subframe belonging to the uplink subframe set and a second open-loop basic working point for an uplink subframe not belonging to the uplink subframe set.

14. The apparatus of claim 13, wherein each of the first parameter set and the second parameter set comprises a nominal transmit power and a UE-specific transmit power for the serving cell.

15. The apparatus of claim 13, wherein the first signaling information, the first parameter set, and the second parameter set are received via a radio resource control (RRC) message.

16. The apparatus of claim 13, wherein the first transmit power is calculated using a sum of a nominal transmit power and a UE-specific transmit power for the serving cell indicated by the first parameter set, and the second transmit power is calculated using a sum of a nominal transmit power and a UE-specific transmit power for the serving cell indicated by the second parameter set.

* * * * *